United States Patent
Ko et al.

(10) Patent No.: US 7,773,181 B2
(45) Date of Patent: Aug. 10, 2010

(54) LIQUID CRYSTAL DISPLAY DEVICE HAVING DATA LINES AND GATE LINES WHOSE WIDTHS STEPWISELY INCREASE

(75) Inventors: Jeong Hoon Ko, Ulsan (KR); Woon Sub Choi, Busan (KR)

(73) Assignee: LG Display Co., Ltd., Seoul (KR)

( * ) Notice: Subject to any disclaimer, the term of this patent is extended or adjusted under 35 U.S.C. 154(b) by 1064 days.

(21) Appl. No.: 11/311,411

(22) Filed: Dec. 20, 2005

(65) Prior Publication Data
US 2006/0290859 A1 Dec. 28, 2006

(30) Foreign Application Priority Data
Jun. 27, 2005 (KR) .................. 10-2005-055976

(51) Int. Cl.
*G02F 1/1343* (2006.01)
*G02F 1/1345* (2006.01)

(52) U.S. Cl. .................. 349/139; 349/33; 349/148; 349/151

(58) Field of Classification Search .................. 349/148, 349/139
See application file for complete search history.

(56) References Cited

U.S. PATENT DOCUMENTS

| | | | |
|---|---|---|---|
| 5,148,301 A * | 9/1992 | Sawatsubashi et al. ...... | 349/153 |
| 6,172,728 B1 * | 1/2001 | Hiraishi ...................... | 349/139 |
| 6,760,081 B2 * | 7/2004 | Takagi ......................... | 349/38 |
| 2001/0012076 A1 * | 8/2001 | Ohkawara et al. ............. | 349/38 |

* cited by examiner

*Primary Examiner*—Andrew Schechter
(74) *Attorney, Agent, or Firm*—McKenna Long & Aldridge

(57) ABSTRACT

A liquid crystal display device according to an embodiment of the present invention includes a liquid crystal display panel which has a plurality of data lines, a plurality of gate lines crossing the data lines, and a plurality of liquid crystal cells that are defined by the data lines and the gate lines; a first data driver disposed at an upper side of the liquid crystal display panel to supply data to odd-numbered data lines; a second data driver disposed at a lower side of the liquid crystal display panel to supply data to even-numbered data lines; a first gate driver disposed at a left side of the liquid crystal display panel to supply a scan pulse to odd-numbered gate lines; and a second gate driver disposed at a right side of the liquid crystal display panel to supply a scan pulse to even-numbered gate lines, and wherein at least any one of the data lines and the gate lines has a line width that varies along its length.

3 Claims, 8 Drawing Sheets

LIQUID CRYSTAL DISPLAY DEVICE HAVING DATA LINES AND GATE LINES WHOSE WIDTHS STEPWISELY INCREASE

This application claims the benefit of Korean Patent Application No. P2005-55976 filed on Jun. 27, 2005, which is hereby incorporated by reference for all purposes as if fully set forth herein.

BACKGROUND OF THE INVENTION

1. Field of the Invention

The present invention relates to a liquid crystal display device, and more particularly to a liquid crystal display device that improves picture quality by reducing a feed-through voltage and signal interference.

2. Discussion of the Related Art

Generally, a liquid crystal display device controls a light transmittance of a liquid crystal by use of an electric field, thereby displaying a picture. The liquid crystal display device includes a liquid crystal display panel where liquid crystal cells are arranged in a matrix and a drive circuit to drive the liquid crystal display panel.

A liquid crystal display device of the related art, as shown in FIG. 1, includes data lines D1 to Dm and gate lines G1 to Gn which cross each other in a liquid crystal display panel 15; and a thin film transistor (hereinafter "TFT") for driving a liquid crystal cell Clc at each crossing point thereof. Further, the liquid crystal display panel includes a storage capacitor Cst for sustaining a voltage of the liquid crystal cell Clc. The liquid crystal cell Clc has an arrangement of liquid crystal molecules that is changed by an electric field which is applied to the liquid crystal cell when a data voltage is applied to a pixel electrode 11 and a common voltage Vcom is applied to a common electrode 12, thereby controlling the amount of transmitted light.

FIG. 2 represents a scan pulse SCP supplied to a gate line G1 to Gn and a voltage Vlc charged in a liquid crystal cell Clc.

Referring to FIG. 2, the scan pulse SCP swings between a gate high voltage Vgh which is set to be a voltage for turning on a TFT, and a gate low voltage Vgl which is set to be a voltage for turning off the TFT. The liquid crystal cell Clc is charged with a data voltage Vdata supplied to the data line D1 to Dm and the charged voltage is sustained for a fixed time during a scanning period when the scan pulse SCP remains at the gate voltage. On the other hand, if the common voltage Vcom is not set to be an optimum voltage or does not remain at the optimum voltage and is shifted toward a positive or negative polarity by as much as an offset voltage Voffset of FIG. 2, a residual DC voltage as much as the offset voltage Voffset is applied to both ends of the liquid crystal cell Clc. As a result, the liquid crystal cell Clc is not charged with the data voltage Vdata corresponding to a video data, but is periodically charged with a voltage which increased by as much as the offset voltage Voffset and a voltage which is decreased by as much as the offset voltage Voffset. If the common voltage Vcom is not optimized, a flicker phenomenon where flickering is generated for each frame period appears in a screen or an afterimage appears in the screen. For example, when the liquid crystal display device is driven at 60 Hz, the screen flickers with a period of 30 Hz. Further, the related art liquid crystal display device is driven with drive circuits at one side, as shown in FIG. 1, except in a case of a large screen. If the liquid crystal display device is driven with drive circuits at one side, a signal 32 transmitted to a final pixel is distorted by a resistance and a capacitance within the liquid crystal display panel in comparison with a signal 31 inputted as in FIG. 3. A feed through voltage deviation ΔVp within the liquid crystal display panel generated in this way becomes a cause of the flicker generation, thus the flicker and the after image become worse as the feed through voltage is higher, thereby causing a picture quality defect as a result thereof.

SUMMARY OF THE INVENTION

Accordingly, it is an object of the present invention to provide a liquid crystal display device that improves picture quality by reducing signal interference and feed-through voltage.

Accordingly, the present invention is directed to a liquid crystal display that substantially obviates one or more of the problems due to limitations and disadvantages of the related art.

An advantage in the present invention is to provide a liquid crystal display with an improved picture with less flicker.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In order to achieve these and other objects of the invention, a liquid crystal display device according to an aspect of the present invention includes a liquid crystal display panel which has a plurality of data lines, a plurality of gate lines crossing the data lines, and a plurality of liquid crystal cells that are defined by the data lines and the gate lines, and wherein at least one of the data lines and the gate lines has a line width that varies along its length.

A liquid crystal display device according to another aspect of the present invention includes a liquid crystal display panel which has a plurality of data lines, a plurality of gate lines crossing the data lines, and a plurality of liquid crystal cells that are defined by the data lines and the gate lines; a first data driver disposed at an upper side of the liquid crystal display panel to supply data to odd-numbered data lines; a second data driver disposed at a lower side of the liquid crystal display panel to supply data to even-numbered data lines; a first gate driver disposed at a left side of the liquid crystal display panel to supply a scan pulse to odd-numbered gate lines; and a second gate driver disposed at a right side of the liquid crystal display panel to supply a scan pulse to even-numbered gate lines, and wherein at least any one of the data lines and the gate lines has a line width that varies along its length.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Reference will now be made in detail to an embodiment of the present invention, example of which is illustrated in the accompanying drawings.

Figure 1:
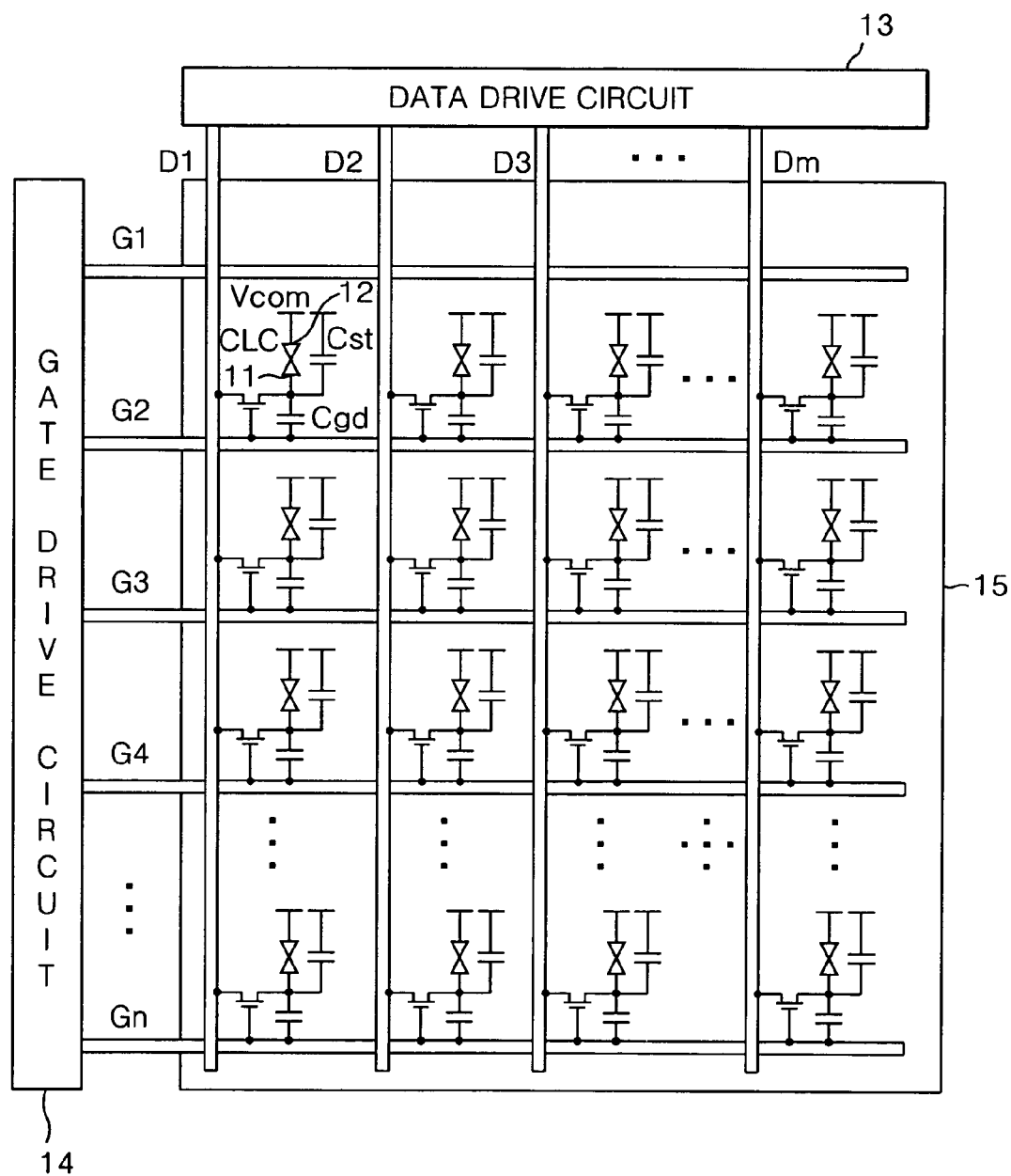
FIG. 1 is a diagram representing a liquid crystal display device of the related art.
Figure 2:
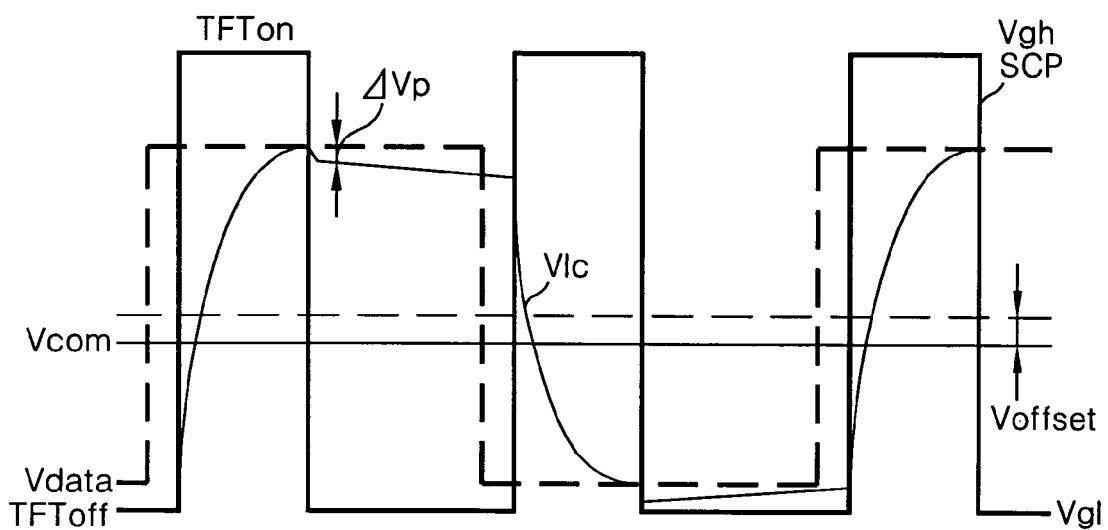
FIG. 2 is a diagram representing a voltage charged in a liquid crystal cell and a scan pulse.
Figure 3:
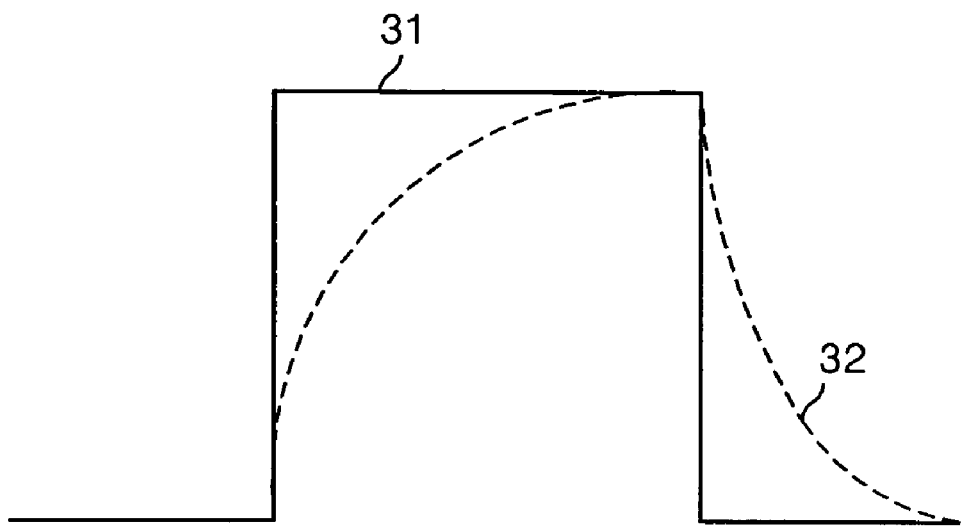
FIG. 3 is a diagram representing an input signal and a signal supplied to a final pixel.
Figure 4:
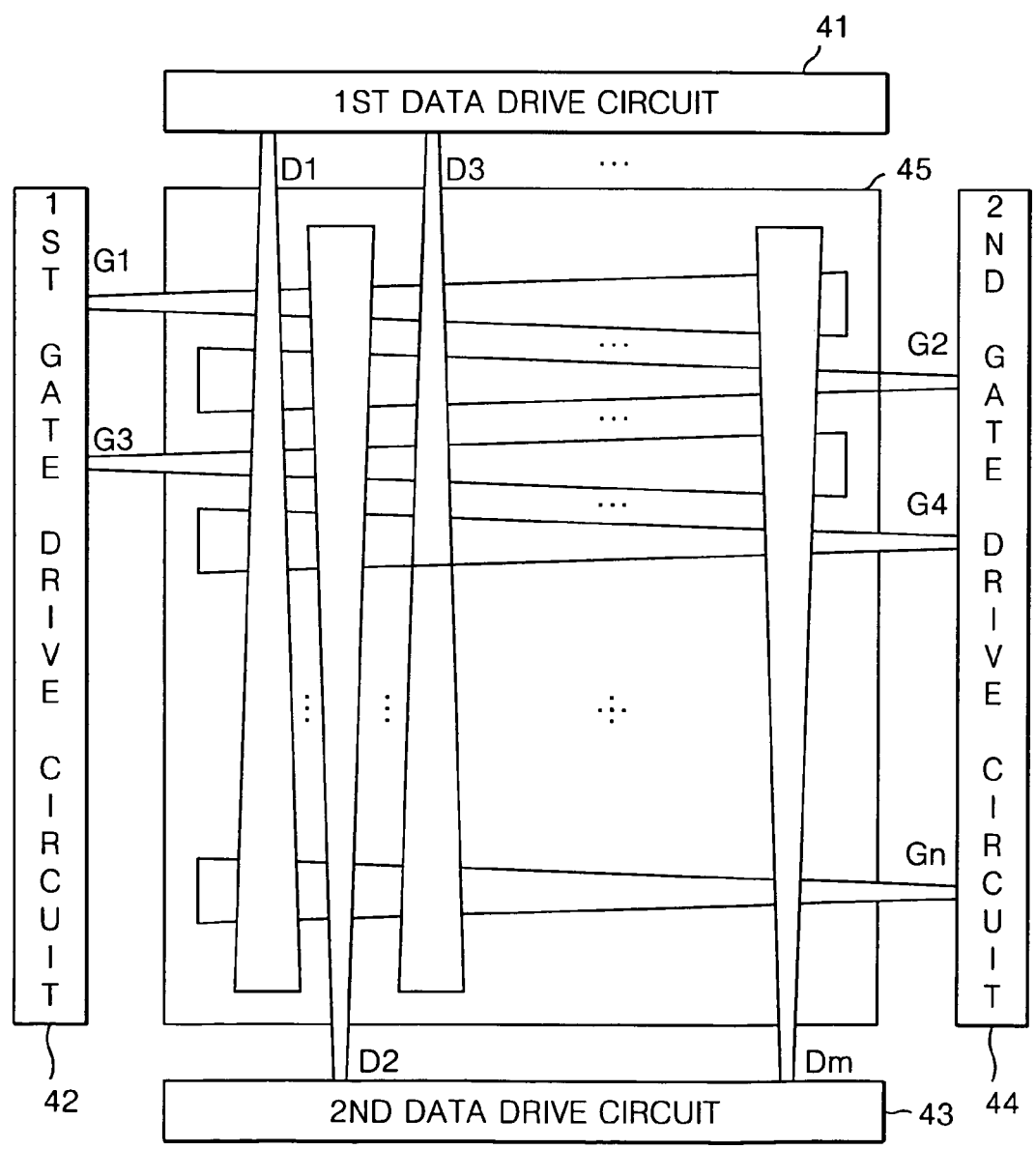
FIG. 4 is a diagram representing a liquid crystal display device according to the present invention.
Figure 5:
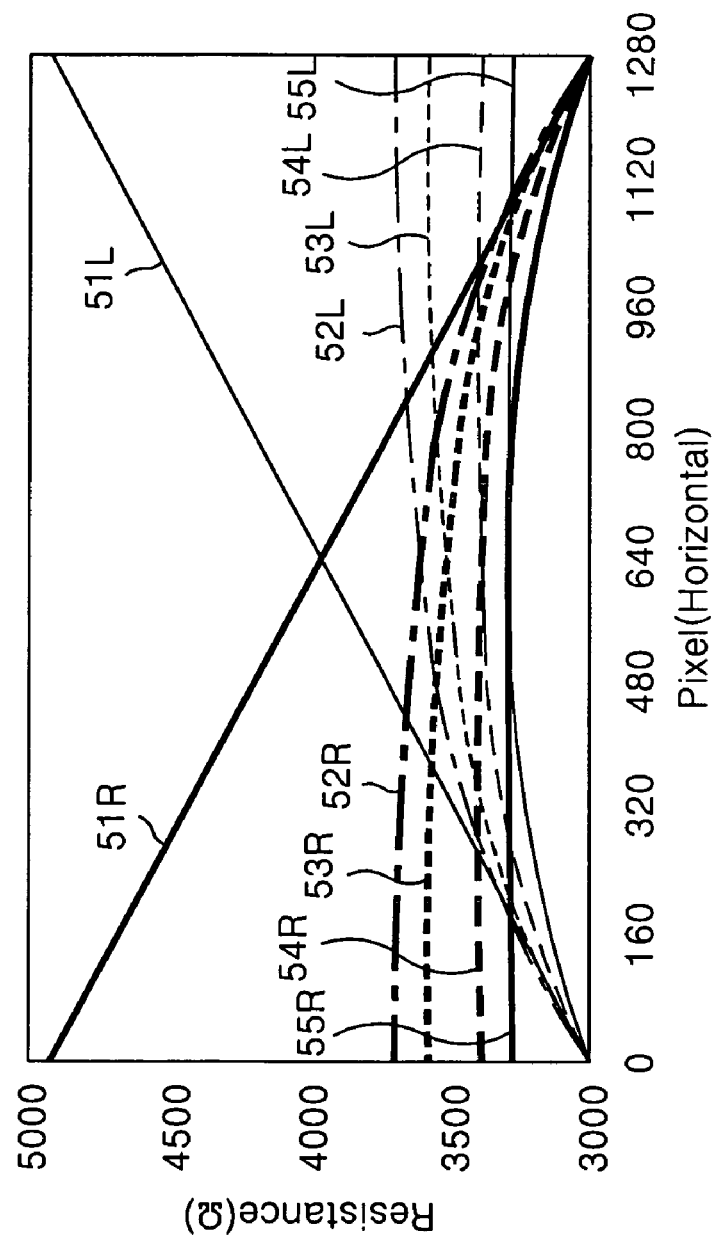
FIG. 5 is a diagram representing a resistance value in accordance with a pixel location.

With reference to FIGS. 4 to 5, embodiments of the present invention will be explained as follows.

FIG. 4 is a diagram representing a liquid crystal display device according to the present invention.

Referring to FIG. 4, the liquid crystal display device according to the present invention includes first and second drive circuits 41, 43 and first and second gate drive circuits 42, 44. The first data drive circuit supplies data to an odd-numbered data line, and the second data drive circuit supplies a data to an even-numbered data line. The first gate drive circuit supplies a scan pulse to an odd-numbered gate line, and the second gate drive circuit supplies a scan pulse to an even-numbered gate line. The data lines D1, to Dm and the gate lines G1 to Gn are respectively connected to the data drive circuit and the gate drive circuit, and a width of the signal line becomes wider as it is farther away from the attached drive circuit.

FIG. 5 is a diagram representing resistance value versus pixel location.

In FIG. 5, a horizontal axis represents a location of a horizontal pixel in the liquid crystal display panel, i.e., gate line, and a vertical axis represents a resistance value in accordance therewith. At this moment, the resistance value of the vertical axis represents that a resistance of 3000Ω is supplied in order to make the resistance equal across the line because a distance from the gate drive circuit to the gate line is different for each line because the length of the gate drive circuit is shorter than a vertical length of the panel in the related art liquid crystal display device. Herein, 3000Ω is supplied, but the size of the supplied resistance may vary in accordance with a characteristic of the liquid crystal display device and its resolution. 51L and 51R represent resistance values in accordance with the pixel location from the first and second gate drive circuits when the line width of the gate line has a uniform width along its length in the related art liquid crystal display device. In other words, 51L represents the resistance value of the gate line that is connected to the first gate drive circuit, and 51R represents the resistance value of the gate line that is connected to the second gate drive circuit. 52L and 52R represent resistance values when the line width doubles over its length. 53L and 53R represent resistance values when the line width triples over its length. In the same manner, 54L and 54R represent resistance values when a line width increase four times over its length. 55L and 55R represent resistance values when a line width increases five times over its length. When the line width of the gate line is uniform, the resistance value continuously increases along the length of the gate line towards the end. However, when the line width of the gate line broadens according to the present invention, the resistance difference between the ends of the gate line, which is connected to the gate drive circuit, can be made to decrease due to the characteristic that resistance is inversely proportional to area. The resistance difference is reduced as the line width difference between the ends of the gate line becomes greater.

Figure 6:
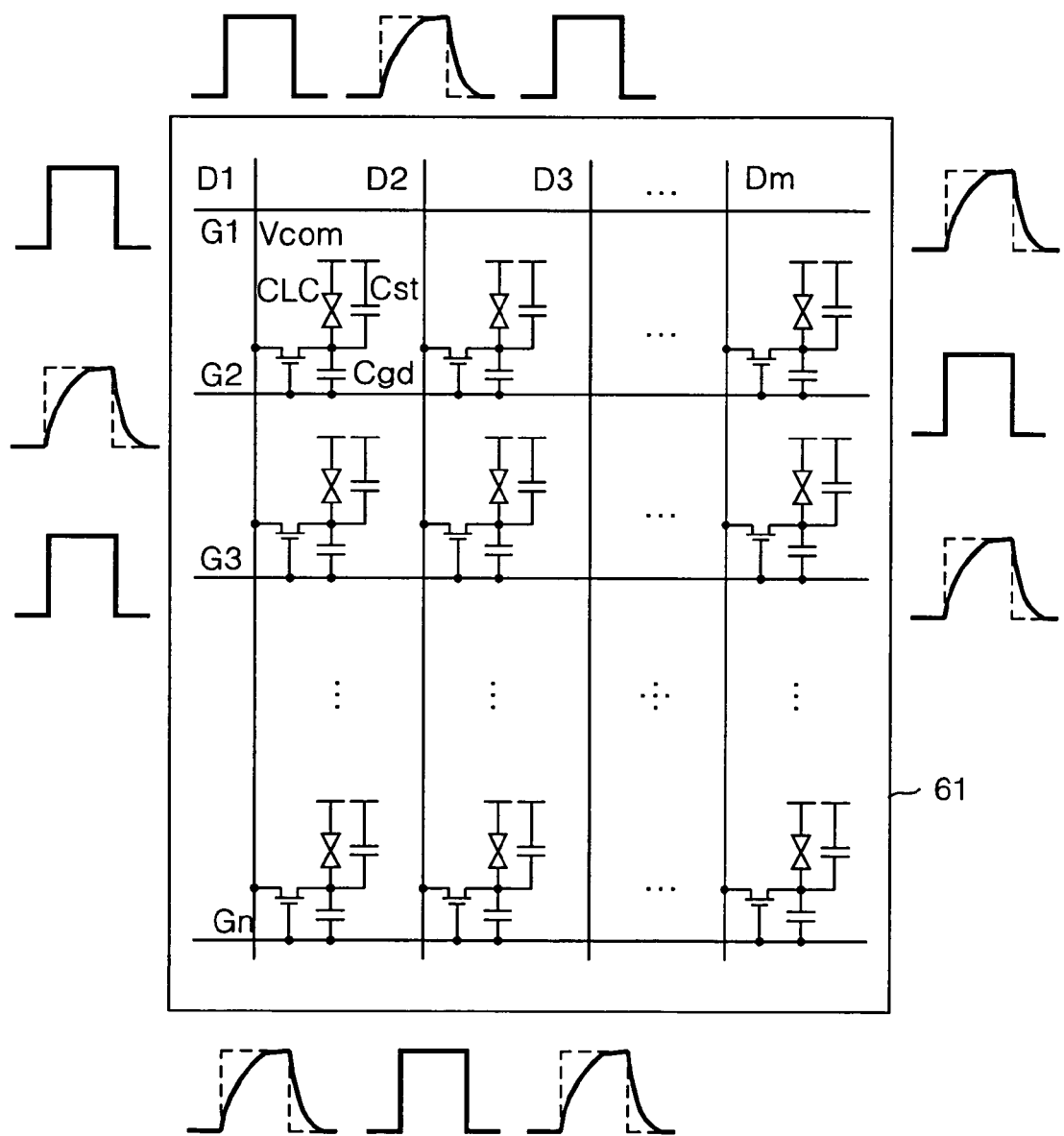
FIG. 6 is a diagram representing an input signal supplied to a data line and a gate line, and a signal supplied to the last pixel.

The liquid crystal display device according to the present invention, as shown in FIG. 6, can reduce signal interference and double the gate pulse width because it can be driven with data and gate drive circuits at both sides. When driven with the drive circuits at just one side in the manner of the related art, the width of the gate pulse is limited by 1/n where n is the number of gate lines, but when driven with the drive circuits at both sides according to the present invention, the gate lines assigned to one gate drive circuit are reduced to half the number thereof so that the width of the gate pulse is limited to 1/(n/2), thus the pulse width control is relaxed in comparison with the related art. Further, when driving the liquid crystal display device with the drive circuits at one side, all gate and data signals start from one side thus generating electrical signal interference between wire lines. But when driving the liquid crystal display device with the drive circuits at both sides, the gate signal and the data signal alternately start from both sides, thus a signal of a second gate line G2 is supplied between a first gate line G1 and a third gate line G3, and a signal of a second data line D2 is supplied between a first data line D1 and a third data line D3, thereby reducing the signal interference.

Figure 7A:
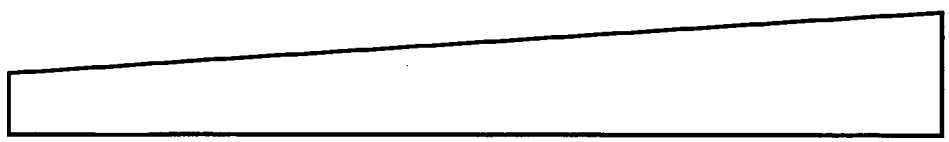
FIGS. 7A-7E illustration alternate embodiments of the gate and data lines.
Figure 7B:
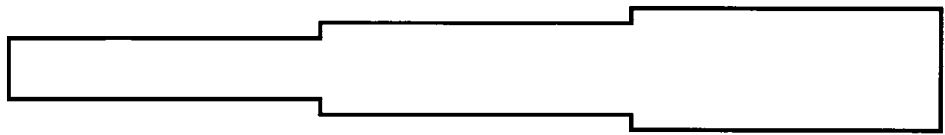
Figure 7C:
Figure 7D:
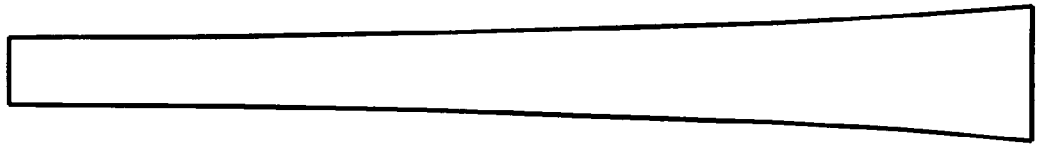
Figure 7E:

In FIG. 4, lines are shown that linearly widen along the length of the line. Other line structures are also possible. FIGS. 7A-7E illustration alternate embodiments of the gate and data lines. In FIG. 7A, one side of the line is perpendicular to the drive circuit while the other side is a strait line at an angle with the drive circuit, so that the width linearly and continuously increases along its length. In FIG. 7B, the sides of the line have steps so that the width of the line increases in a stepwise fashion along the length of the line. The number of steps can be any number. In FIG. 7C, one side of the line is perpendicular to the drive circuit while the other side has steps so that the width of the line increases in a stepwise fashion along the length of the line. Again, the number of steps can be any number. In FIG. 7D, both sides of the line have a continuous curved shape so that the width nonlinearly and continuously increases along its length. The curved shape of the two sides may be the same or different. In FIG. 7E, one side of the line is perpendicular to the drive circuit while the other side has a continuous curved shape so that the width nonlinearly and continuously increases.

As described above, the liquid crystal display device according to the present invention disposes the data drive circuits and the gate drive circuits at both sides of the display and have varying line widths for the data line and the gate line different to reduce the feed through voltage and the signal interference, thereby easing the flicker and the afterimage to improve the picture quality.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
    a liquid crystal display panel which has a plurality of data lines, a plurality of gate lines crossing the data lines, and a plurality of liquid crystal cells that are defined by the data lines and the gate lines;
    a first data driver disposed at an upper side of the liquid crystal display panel to supply data to odd-numbered data lines;
    a second data driver disposed at a lower side of the liquid crystal display panel to supply data to even-numbered data lines;
    a first gate driver disposed at a left side of the liquid crystal display panel to supply a scan pulse to odd-numbered gate lines; and
    a second gate driver disposed at a right side of the liquid crystal display panel to supply a scan pulse to even-numbered gate lines, and
    wherein a line width of each data line stepwisely increases as the data line extends away from one end of the data line connected to the corresponding data driver to the other end of the data line and a line width of each gate line stepwisely increases as the gate line extends away from one end of the gate line connected to the corresponding gate driver to the other end of the gate line.

2. The liquid crystal display device according to claim 1, wherein the line width of one of the gate line and data line increases linearly.

3. The liquid crystal display device according to claim 1, wherein one side of one of the gate line and data line is perpendicular to the corresponding gate and data driver, respectively.

* * * * *